US009817826B2

(12) United States Patent
Chen et al.

(10) Patent No.: US 9,817,826 B2
(45) Date of Patent: Nov. 14, 2017

(54) SYSTEM AND METHOD FOR RECOMMENDING MEDIA PROGRAMS AND NOTIFYING A USER BEFORE PROGRAMS START

(71) Applicant: Google Inc., Mountain View, CA (US)

(72) Inventors: Qiliang Chen, Beijing (CN); Weihua Tan, San Bruno, CA (US)

(73) Assignee: GOOGLE INC., Mountain View, CA (US)

( * ) Notice: Subject to any disclaimer, the term of this patent is extended or adjusted under 35 U.S.C. 154(b) by 517 days.

(21) Appl. No.: 13/629,167

(22) Filed: Sep. 27, 2012

(65) Prior Publication Data
US 2014/0089953 A1    Mar. 27, 2014

(51) Int. Cl.
G06F 3/00      (2006.01)
G06F 13/00     (2006.01)
H04N 5/445     (2011.01)
G06F 17/30     (2006.01)
H04N 7/16      (2011.01)
(Continued)

(52) U.S. Cl.
CPC ...... G06F 17/30023 (2013.01); G06F 17/301 (2013.01); H04N 7/162 (2013.01); H04N 21/25891 (2013.01); H04N 21/2665 (2013.01); H04N 21/44222 (2013.01); H04N 21/4532 (2013.01); H04N 21/478 (2013.01); H04N 21/47211 (2013.01); H04N 21/4826 (2013.01);
(Continued)

(58) Field of Classification Search
CPC .. H04N 21/25; H04N 21/251; H04N 21/4532; H04N 21/4668
See application file for complete search history.

(56) References Cited

U.S. PATENT DOCUMENTS

2003/0126600 A1    7/2003 Heuvelman
2008/0010253 A1 *  1/2008 Sidhu ............... G06F 17/30398
(Continued)

FOREIGN PATENT DOCUMENTS

WO    WO 03/088655 A1    10/2003

OTHER PUBLICATIONS

Google Inc., International Search Report and Written Opinion, PCT/US2013/062360, dated Dec. 10, 2013, 8 pgs.
(Continued)

Primary Examiner — Kyu Chae
(74) Attorney, Agent, or Firm — Morgan, Lewis & Bockius LLP

(57) ABSTRACT

A system and method for searching and/or subscribing to media programs and notifying the user before a recommended program starts in response to a user's request for recommendation. A server receives a user request for a media program event recommendation from a client device. The user request comprises user media program recommendation setting. The server generates a search query in accordance with the user request. The server runs the search query against one or more databases to generate a recommendation containing one or more media program events. At least one of the databases consists of scheduled media program events. The server sends automatically, without user interaction, to one or more user-designated calendar programs, a calendar event corresponding to a recommended media program event. The calendar event includes a respective date, time and duration.

25 Claims, 10 Drawing Sheets

(51) Int. Cl.
    *H04N 21/482*     (2011.01)
    *H04N 21/81*     (2011.01)
    *H04N 21/258*     (2011.01)
    *H04N 21/2665*     (2011.01)
    *H04N 21/442*     (2011.01)
    *H04N 21/45*     (2011.01)
    *H04N 21/472*     (2011.01)
    *H04N 21/478*     (2011.01)
    *H04N 21/658*     (2011.01)
    *H04N 21/84*     (2011.01)

(52) U.S. Cl.
    CPC ..... *H04N 21/6582* (2013.01); *H04N 21/8126* (2013.01); *H04N 21/84* (2013.01)

(56) References Cited

U.S. PATENT DOCUMENTS

| | | | |
|---|---|---|---|
| 2009/0055385 A1* | 2/2009 | Jeon et al. | 707/5 |
| 2011/0225015 A1* | 9/2011 | Spivack et al. | 705/7.24 |
| 2011/0246440 A1* | 10/2011 | Kocks | G06F 17/30781 707/706 |
| 2011/0283232 A1* | 11/2011 | Jordan et al. | 715/810 |
| 2014/0075284 A1* | 3/2014 | Logtenberg | 715/234 |

OTHER PUBLICATIONS

Google Inc., International Preliminary Report on Patentability, PCT/US2013/062360, dated Mar. 31, 2015, 6 pgs.

* cited by examiner

SYSTEM AND METHOD FOR RECOMMENDING MEDIA PROGRAMS AND NOTIFYING A USER BEFORE PROGRAMS START

TECHNICAL FIELD

The disclosed implementations relate generally to the field of search enhancement and more particularly to searching, subscribing to media program events in response to a user's request for recommendation and notifying the user before a recommended program event starts.

BACKGROUND

The variety and number of multimedia shows and programs available for a wide range of audience and viewers have exploded in the past few decades. Nowadays, people can enjoy these media programs on different platforms (on TV, Internet-connected electronic devices) and in different venues (home, movie theaters, concert halls, just to name a few).

Not surprisingly, there are many program guides offered to people to help them select which program to watch. These program guides include the traditional media program event guides such as a TV guide and movie listings as well as online schedules of programs and shows that became common after the arrival of various online content streaming services in the recent years. However, these program event guides are not tailored for each individual's interests. For example, a user can only view program list for particular channels. Furthermore, these program guides do not remind a user of when programs of interest to the user will be played or performed.

SUMMARY

A number of implementations that overcome the limitations and disadvantages described above are presented in more detail below. These implementations provide methods and systems for searching and/or subscribing to media programs of interest to a user and notifying the user before a recommended program starts.

As described in more detail below, some implementations involve a method performed at a computer system, which includes one or more processors for executing programs and memory storing the one or more programs. The method includes receiving, from a client device, a user request for a media program event recommendation. The user request comprises user media program recommendation setting. The method further includes creating a search query in accordance with the user request. The method then runs the search query against one or more databases to generate a recommendation containing one or more media program events. At least one of the one or more databases consists of scheduled media program events. The method further includes sending automatically, without user interaction, to one or more calendar programs designated by the user, a calendar event corresponding to a recommended media program event. The calendar event includes a respective date, time and duration. The method can be used for searching and/or subscribing to media programs and notifying the user before a recommended program starts.

In some implementations, the above method further includes collecting user web activity data associated with media program events prior to receiving the user request and creating the search query in view of the user web activity data as well as the user request.

In some implementations, the above method also includes adding to the one or more user-designated calendars one or more calendar events corresponding to the media program event recommendation.

In some implementations, the method further includes generating one or more reminders for media program events corresponding to the media program recommendation. The modality of the one or more reminders includes at least one of the following: email, text messaging, voice mail, calendar pop-up, push notification, IM chat message and post to a social network.

In some implementations, a non-transitory computer readable storage medium stores one or more programs for execution by one or more processors of a server system, the one or more programs comprising instructions that, when executed by the one or more processors, cause the server system to perform the above described methods.

In some implementations, a server system for searching, subscribing to media programs and notifying the user before a recommended program starts is disclosed. The server system have one or more processors and memory storing programs for execution by the one or more processors and having access to one or more databases of media program events. The server system receives from a client device a user request for a media program event recommendation. The user request includes user media program recommendation setting. The server then creates a search query in accordance with the user request. The search query is run against the one or more databases to generate one or more media program event recommendations. At least one of the one or more databases consists of scheduled media program events. The server then sends automatically, without user interaction, to one or more user-designated calendar programs a calendar event corresponding to a respective media program event recommendation. The calendar event includes a respective date, time and duration.

Thus, computer systems and methods are disclosed that provide a personalized media program recommendation and other additional enhanced features for a user to better enjoy the rich media programs available today.

BRIEF DESCRIPTION OF THE DRAWINGS

For a better understanding of the disclosed implementations as well as additional aspects and implementations thereof, reference should be made to the Description of Implementations below, in conjunction with the following drawings in which like reference numerals refer to corresponding parts throughout the figures.

DESCRIPTION OF IMPLEMENTATIONS

Figure 1:
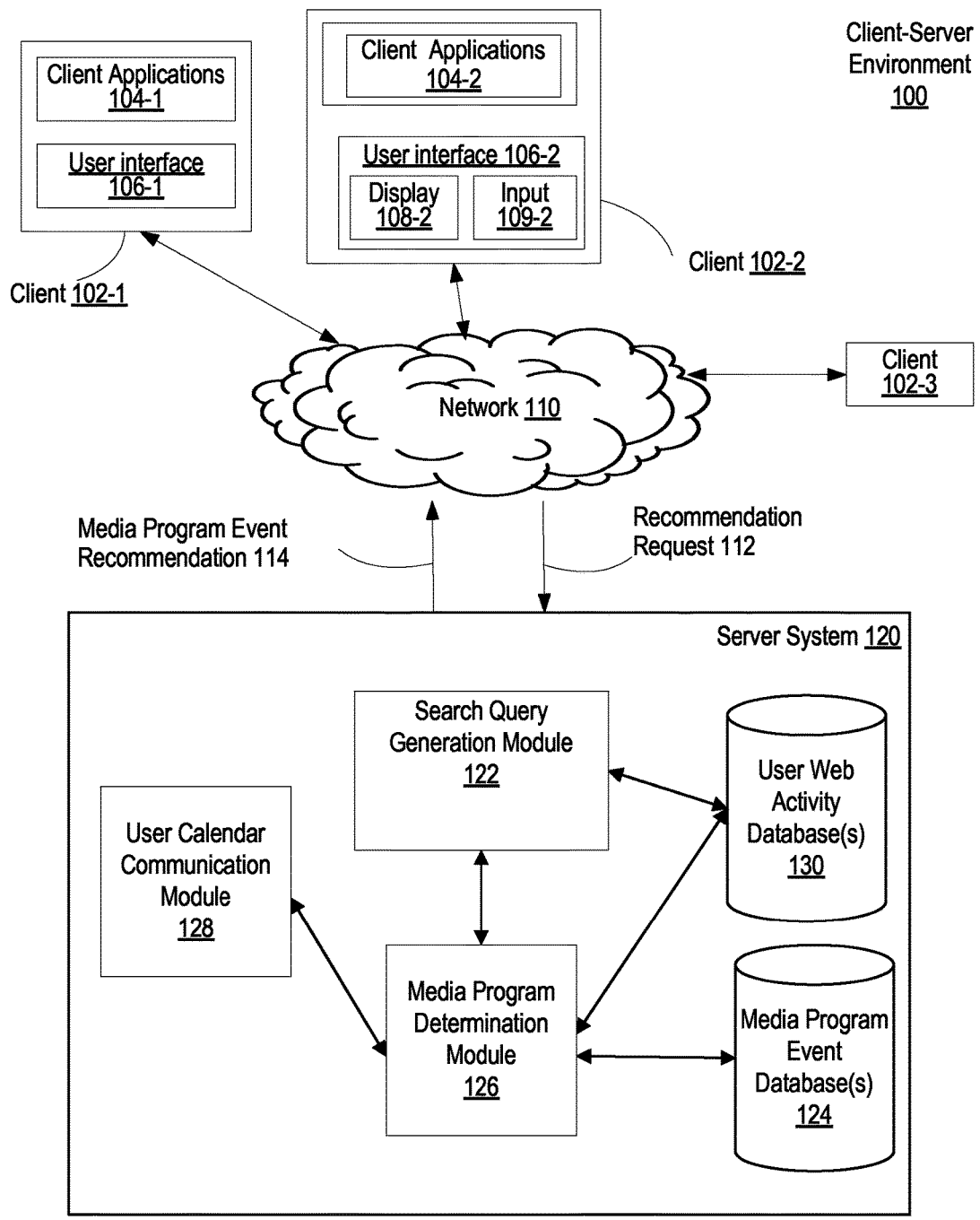
FIG. 1 is a block diagram illustrating an exemplary computer network that includes a server system for searching and sending recommended media program events to a user's designated calendar, in accordance with some implementations.

FIG. 1 is a block diagram illustrating an exemplary client-server environment 100 according to some implementations. In FIG. 1, the client-server environment 100 includes a server system 120, one or more client systems or devices (referred to hereinafter as client) 102. One or more communications networks 110 interconnect these components. The communications network 110 may be any of a variety of networks, including local area networks (LAN), wide area networks (WAN), wireless networks, wired networks, the Internet, or a combination of such networks. In some implementations, a client 102 is located in a remote location with respect to the server system 120. In some other implementations, a client 102 is in close proximity to the server system 120.

According to some implementations, a client 102 includes a client application 104 and a user interface 106. The client application 104, when executed by the client 102, sends a request for media program event recommendation to the server system 120. In some implementations, the client application 104 is selected from the set consisting of a search application, a search engine plug-in for a browser application, and a search engine extension for a browser application. In some implementations, the user interface 106 includes a display device 108 capable of displaying a media program and a user input device for user input.

The client 102 sends media program recommendation requests 112 and instructions to, and receives data (including media program recommendation 114) from, the server system 120. The client 102 may be any computer or other electronic device that is capable of communicating with the server system 120. Examples of client 102 include, without limitation, desktop and notebook computers, mainframe computers, server computers, mobile devices such as mobile phones, smart phones, and personal digital assistants, network terminals, and set-top boxes.

According to some implementations, the server system 120 includes a search query generation module 122, a media program event database 124, a media program determination module 126, a user calendar communication module 128. In some implementations, the server system 120 also includes user web activity database(s) 130. In some implementations, the server system 120 does not include user web activity database 130 but have access to user web activity database 130 located at and managed by other servers.

The server system 120 receives program request 112 from one or more client 102 through the communication network 110. The search query generation module 122 takes the request 112 and generates a corresponding search query. In some implementations, the search query is generated in view of the related user behavior data stored in the user web activity database 130. The media program determination module 126 runs the search query generated by the search query generation module 122 against the media program event database 124 and determines a list of media program to recommend to the user in response to the request 112. The user calendar communication module 128 then formats the list of recommended programs determined by the media program determination module 126 and sends the media program event recommendation 114 to a respective client 102 through the communication network 110.

As used herein, the term "media program event" refers to a scheduled media program with a play date in the future. Exemplary media program events include, but are not limited to, TV shows, movies, performances (e.g., ballet, opera or concerts to be performed at local performance venues), and online media streaming or live broadcasting, to be played or performed during a certain time period in the future with specific times and dates.

As used herein, the terms "recommendation request" or "user request" refer to user request 112 for recommendation of media program events. In some implementations, a user request 112 is a combination of one or more of the following: time period, show title, show description, series id, cast, and genre. In some implementations, a user request may even include some of the user preferences such as the number of program events to recommend or programs played by certain actor.

Figure 2A:
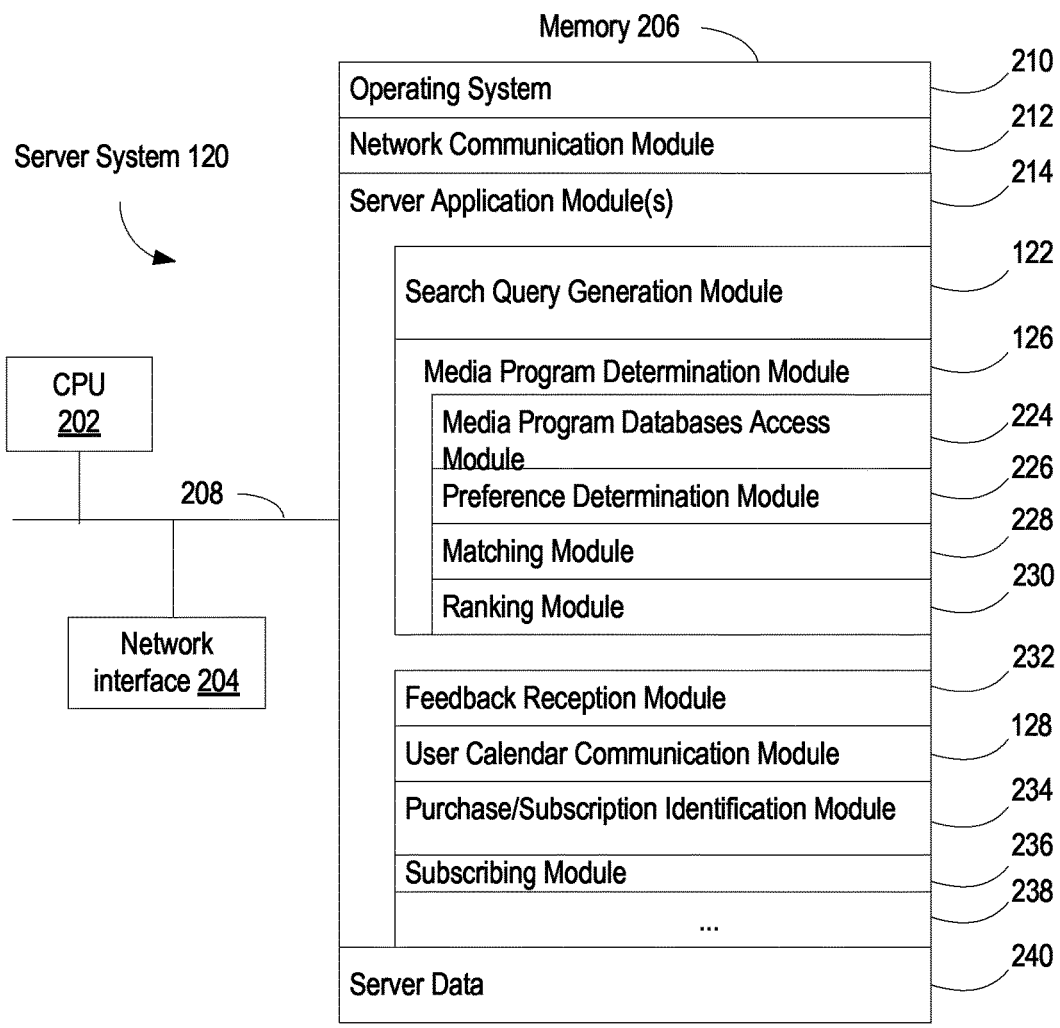
FIG. 2A is a block diagram illustrating a server system in accordance with some implementations.
Figure 2B:
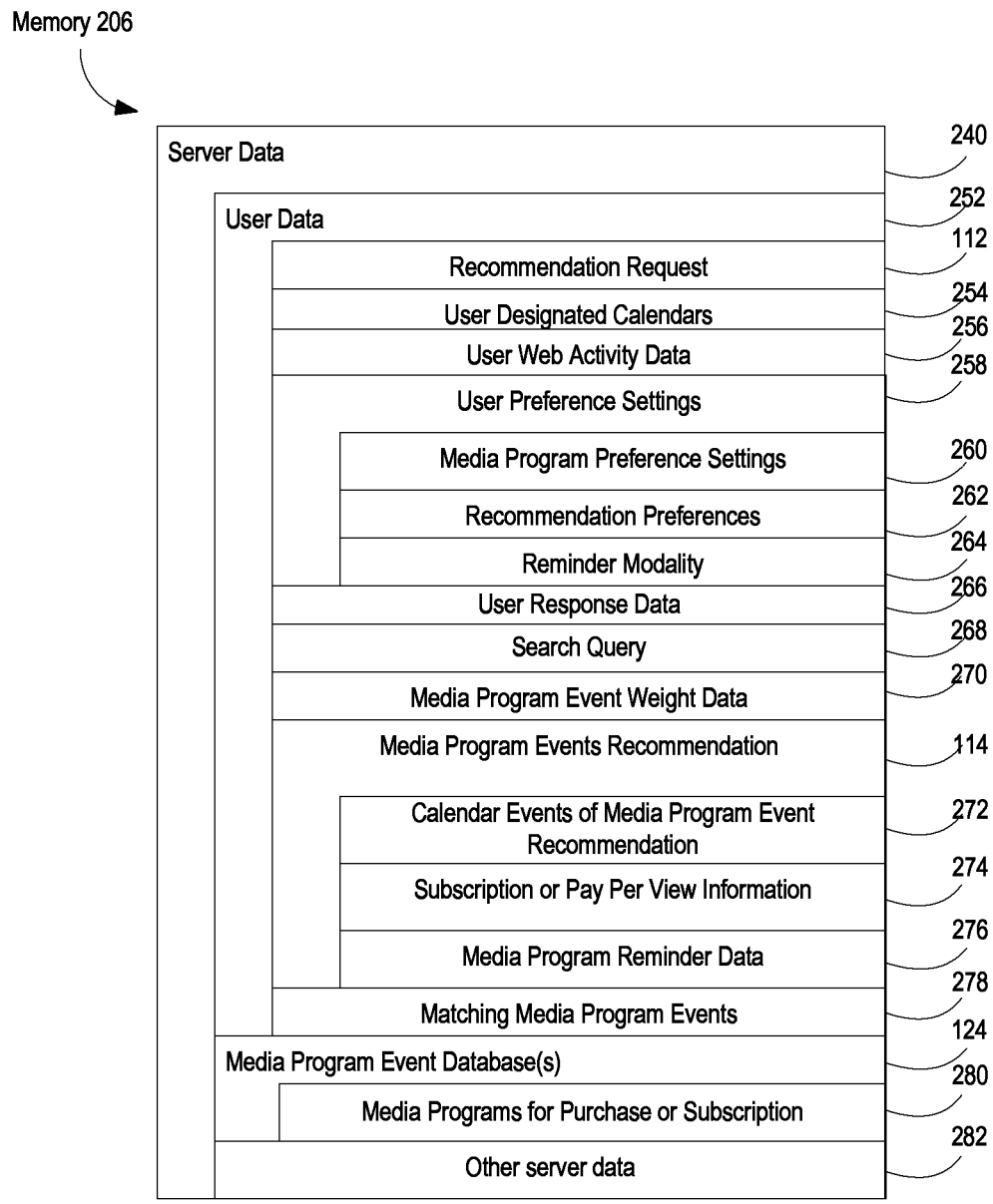
FIG. 2B is a block diagram further illustrating the memory of a server system memory in accordance with some implementations.

FIG. 2 is a block diagram illustrating a server system 120 in accordance with some implementations. The server system 120 typically includes one or more processing units (CPU's) 202, one or more network interfaces 204, a memory 206, and one or more communication buses 208 for interconnecting these components and for connecting with other systems. A memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. A memory 206 optionally includes one or more storage devices remotely located from the CPU(s) 202. A memory 206, or alternately the non-volatile memory device(s) within memory 206, includes a non-transitory computer readable storage medium. In some implementations, memory 206 or the computer readable storage medium of memory 206 stores the following programs, modules and data structures, or a subset thereof:

- operating system 210 that includes procedures for handling various basic system services and for performing hardware dependent tasks;
- a network communication module (or instructions) 212 that is used for connecting the server system 120 to other computers via the one or more communication network interfaces 204 (wired or wireless) and one or more communication networks 110 (FIG. 1), such as the Internet, other wide area networks, local area networks, metropolitan area networks, and so on;
- server application modules 214 for performing the services offered by the server system, including but not limited to:
  - a search query generation module 122 for determining a search query 262 based at least in part on the user request 112.
  - a media program determination module 126 for using the search query 262 generated by search query generation module 122 to identify a plurality of media program events in the media program event databases 124. The media program determination module 126 typically includes but is not limited to the following modules:

a database access module 224 for accessing a media program event database 124;

a preference determination module 226 for identifying a weight score for each term in the search query 262 in accordance with user media program preference setting 264;

a matching module 228 that runs the generated search query 262 against the media program event information database 124 and identifying a set of candidate media program events 267 matching at least one term of the search query 262;

a ranking module 230 for ranking the candidate program events identified by matching module 228 according to their weight scores;

a user calendar communication module 128 for communicating with the calendar servers of the calendar accounts designated by the user so that calendar events corresponding to the recommended media program events will be properly set up in the user-designated calendars;

a feedback reception module 232 for receiving feedback from the user of a client 102 that is in addition to the recommendation request 112, including but not limited to: user recommendation preferences 260 regarding the recommendation request 112, user calendar account information 254. In some implementations, the user feedback includes user instruction or response data 276 regarding subscription or purchase of one or more of the recommended media program events;

optionally, a purchase/subscription identification module 234 for identifying media programs that require subscription or purchase from the media program recommendation list determined by the ranking module 230;

a purchase/subscription module 236 for corresponding with the servers of the media program that requires subscription or purchase to subscribe or purchase the programs according to the user's instruction;

other server application modules.

server data 240, holding data related to the server system 120, including but not limited to:

user data 252, including but not limited to the following categories of data:

user recommendation request 112;

data concerning user designated calendars 254 for user calendar communication module 128;

user web activity data 256 retrieved from user web activity database 130;

user preference settings 258, which may be used by various modules, including but not limited to media program determination module 126, user calendar communication module 128, and purchase/subscription identification module 234. Examples of user preference settings 258 include but are not limited to the following data categories:

user media program preference settings 260 (e.g., horror movies) used by preference determination module 226;

recommendation preferences 262 such as the number of media program events to be recommended;

preferred reminder modality 264 such as pop up, email or SMS text messaging;

optionally, user response data 266 received by feedback reception module 232;

Search query 268 generated by search query determination module 122;

user specific media program term weight data 270;

media program events recommendation 114 to send to the user of the client 102, including but not limited to the following data:

Calendar events of media program event recommendation 272;

subscription or purchase information 274; and media program reminder data 276;

matching media program events 278 associated with the generated search query 262 determined by the matching module 228;

optionally, locally stored media program event information databases 124, including but not limited to purchase or subscription data of certain media program 280;

other server data 282.

In some implementations, user media program preference settings 260 include interest subscription of a user. The server system 120 collects, maintains and updates user interest subscriptions associated with media program events. The user can submit his or her program interests by typing a keyword or selecting a genre. User interest subscription data allow the server system 120 to perform more efficient search and to recommend more relevant programs to the user. For example, if the user is a big fan of "Lady Gaga", then he can subscribe to an interest category called "Lady Gaga" for any Lady Gaga related programs or events. As another example, a user may subscribe to an interest category called "sci-fi movie." As explained in more detail below, the server system 120 notifies the user of recommended programs when the server system 120 determines that there are upcoming programs that match the user's interest subscription (as part of user media program preference settings).

In some implementations, the search query generation module 122 accesses a respective user's web activity database 130, which may be stored locally or remotely, and determines the relevant user activities that are related to the user recommendation request 112. In some implementations, the search query generation module 122 identifies additional terms to include in the search query 262 to improve the search results. In some implementations, the search query generation module 122 conducts a search on the fly on the Internet (e.g., at certain default websites) based on the terms contained in the user request 112 to identify additional terms and to add to the search query 262.

In some implementations, when the media program event database 124 is remotely located, the database access module 224 is also responsible for communicating with the remote database server or manager over networks and retrieving the relevant data.

In some implementations, the user media program preference setting 264 are derived from a combination of sources: the user preference setting already stored on the server, current user preferences included in the recommendation request 112, or other user response data 276, or the user preference setting determined based on data in the user web activity database(s) 130.

In some implementations, the weight scores are calculated based on the weight value for search query terms determined by the preference determination module 226 as discussed in more detail below. The ranking module 230 then sends a predetermined number of the top ranked program events to user calendar communication module 128. The specific user preference setting 256 typically includes the number of programs to recommend (e.g., top 5, top 10 etc.).

Each of the above-identified modules, applications or programs corresponds to a set of instructions, executable by the one or more processors of server 120, for performing a function described above. The above identified modules, applications or programs (i.e., set of instructions) need not be implemented as separate software programs, procedures or modules, and thus various subsets of these modules may be combined or otherwise rearranged in various embodiments. In some implementations, memory 206 optionally stores a subset of the modules and data structures identified above. Furthermore, memory 206 may stores additional modules and data structures not described above.

Figure 3:
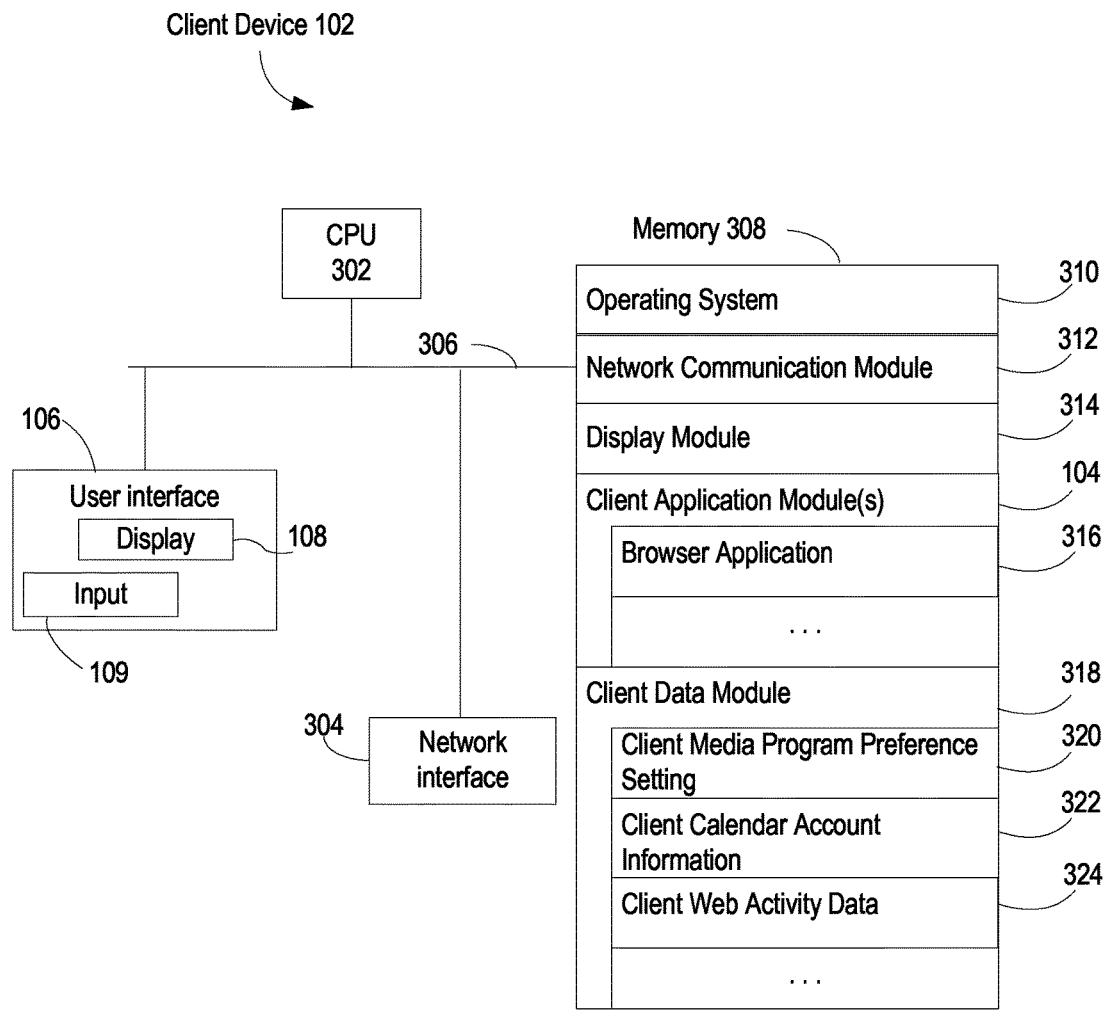
FIG. 3 is a block diagram illustrating a client system in accordance with some implementations.

FIG. 3 depicts a block diagram illustrating a client system 102 in accordance with some implementations. The client system 102 typically includes one or more processing units (CPU's) 302, one or more network interfaces 304, memory 308, and one or more communication buses 306 for interconnecting these components. The client system 102 includes a user interface 106. The user interface 106 includes a display device 108 and a user input 109. The user interface 109 optionally includes an input means such as a keyboard, mouse, a touch sensitive display, or other input buttons (not shown). Furthermore, some client systems use a microphone and voice recognition to supplement or replace the keyboard.

Figure 4:
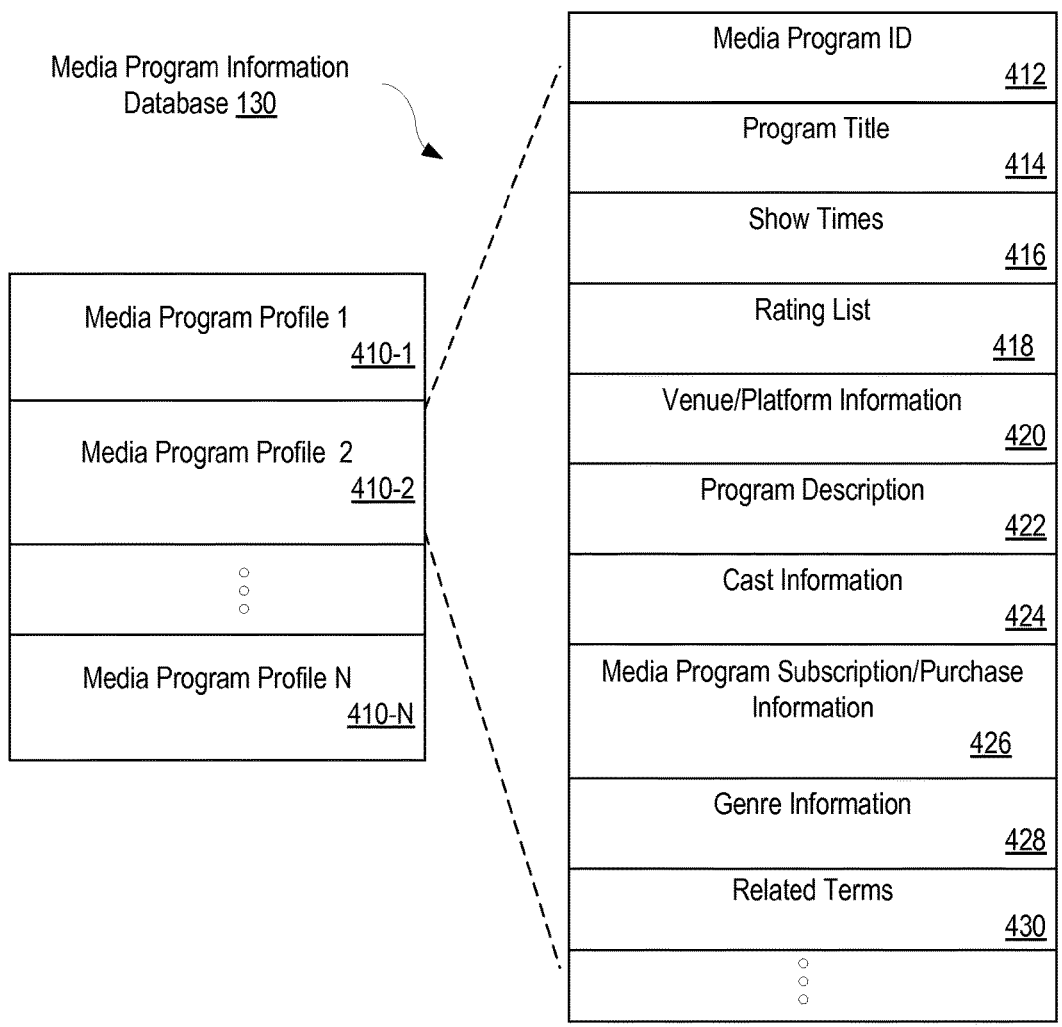
FIG. 4 is a block diagram of an exemplary data structure used by a user web activity database to store user web activity information in accordance with some implementations.
Figure 5:
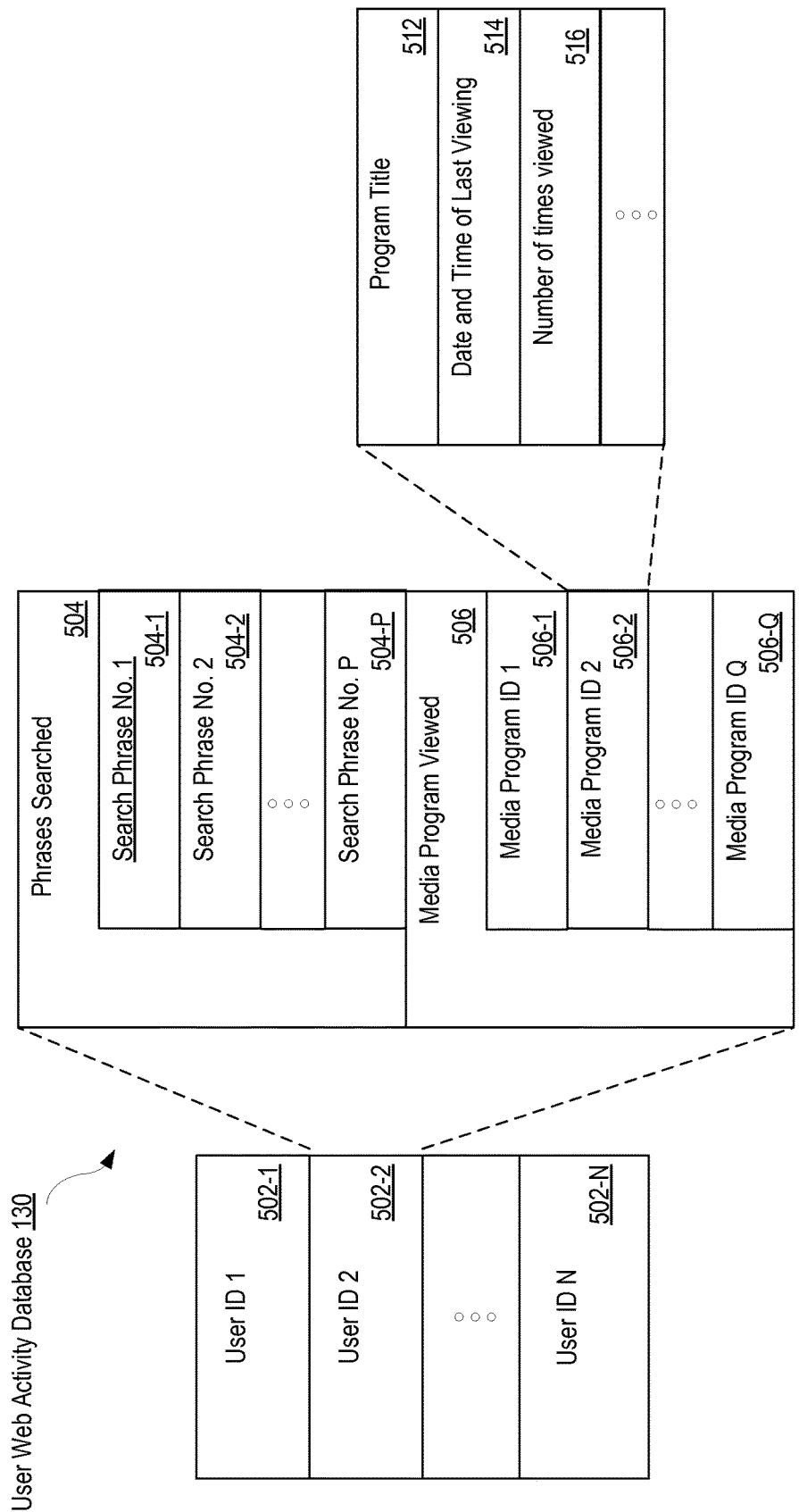
FIG. 5 is a block diagram of an exemplary data structure used by a media program event data base to store information for a set of media program events in accordance with some implementations.

Memory 308 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. A memory 308 optionally includes one or more storage devices remotely located from the CPU(s) 302. The memory 308, or alternately the non-volatile memory device(s) within the memory 308, includes a non-transitory computer readable storage medium. In some implementations, memory 308 or the computer readable storage medium of memory 308 stores the following programs, modules and data structures, or a subset thereof:

- an operating system 310 that includes procedures for handling various basic system services and for performing hardware dependent tasks;
- a network communication module 312 that is used for connecting the client system 102 to other computers via the one or more communication network interfaces 304 (wired or wireless) and one or more communication networks, such as the Internet, other wide area networks, local area networks, metropolitan area networks, and so on;
- a display module 314 for enabling the information generated by the operating system 310 and client applications 104 to be presented visually on the display 108;
- one or more client application modules 104 for handling various aspects of interacting with the media program recommendation server 120, including but not limited to: a browser application 316 for sending recommendation request to and receiving from the media program recommendation server 120;
- a client data module 318, for storing data relevant to the clients, including but not limited to client media program preference setting 320, client calendar account information 322, client web activity data 324;

FIGS. 4 and 5 include a conceptual block diagram of a media program event information database 130 for storing media program event information and a user web activity database for storing user history terms and web activities, respectively. In various implementations, the information in the database may be stored in multiple data structures, or even multiple computers, and need not be organized in the specific manner shown in FIGS. 4 and 5.

Turning to FIG. 4, it depicts a block diagram of an exemplary data structure for the media program event information database 130 for storing media program event information 410 in accordance with some implementations. The database data structure 130 includes a plurality of media program profile records 410-1 to 410-N, each of which corresponds to a specific media program event. In some implementations, each media program profile record 410 contains media program metadata, including media program ID 412 that identifies a particular media program event, the title of the program 414, the set of corresponding show times (a set of times, each time corresponding to one period during which the media program is played) 416, a rating list for classifying the media program event 418, venue/platform information 420, a program description outlining the content of the media program 422, cast information 424, subscription/purchase information 426, genre information 428, and other related terms 430 associated with the media program.

FIG. 5 depicts a block diagram of an exemplary data structure for the user web activity database 130 for storing user history terms and web activity (especially media program related ones) in accordance with some implementations. As shown, the database data structure 130 includes a plurality of user web activity records 502-1 to 502-N, each of which corresponds to a user. In some implementations, each user web activity record 502 contains at least two categories of data entries: search phrases 504 that the user has entered in a search window of a browser or a portal (e.g., web browser, YouTube, Google Search) and media programs 506 (or the trailers of the media programs) that the user has previously watched.

In some implementations, a media program record 506 includes program title 512, Date and Time of the most recent viewing of the media program, total number of times 516 the user has viewed the trailer of that media program. In some implementations, media program 506 also includes the number of times the user has searched for the program. (not shown). In some implementations, a media program 506 also includes a program description entry, a media type (e.g., TV or movie) or other information (not shown) so that two different media programs having the same title will in fact have two different media program 506 entries.

FIGS. 6A-6E are flow diagrams illustrating a method of searching and sending media program event recommendation to a user's designated calendar, in accordance with some implementations. Each of the operations shown in FIGS. 6A-6E may correspond to instructions stored in a computer memory or computer readable storage medium. Optional operations are indicated by dashed lines (e.g., boxes with dashed-line borders).

In some implementations, the server system 120 (FIG. 1) receives from a client 102 a user's recommendation request 112 for media program events (602). Typically, the user request 112 includes some if not all of user media program preference setting 320. Examples of recommendation setting 320 include, but are not limited to, number of program event to recommend, the maximum or minimum program time, and the expiration date of the programs to be recommended. In some implementations, the server system 120 communicates with the client 102 to receive additional information after receiving the user request 112, as discussed with respect to step 616 and step 620 below.

In some implementations, the server system 120 collects web activity data of a user associated with media program events prior to receiving the request 112 (604). In some implementations, the server system 120 maintains and updates web activity database 130 for a user by collecting data reflecting a user's web activity concerning media programs during its routine crawling of the Internet. For example, if a user searches for information relating to a particular TV sitcom series called "Seinfeld," the server system 120 first determines whether a data entry already exists for that user in the web activity database 130. If not, the server system 120 first creates an entry (see e.g. 502 in FIG. 5) for that user. If there is already a data structure existing for that user, the server system 120 simply adds an entry called phrase searched 504 for the search phrase the user entered in the search window. The phrase searched 504 further includes entries for metadata such as: a program title, media type and genre with the corresponding values "Seinfeld," "TV" and "Sitcom." In some implementations, the phrase searched 504 also records the number of times the user has searched for the same media program and other data relating to the user's web activity.

In some implementations, the collected web activity data of a user includes media programs (or a trailer of a show) the user has viewed before (256 in FIG. 2B, 506 in FIG. 5), which further includes both information about a particular media program and the user's behavior with respect to that program, such as the title of the program 512, the time of last viewing 514 and number of times the user has searched for information about the program 516. In the above example, if the user subsequently viewed the pilot of "Seinfeld," the server system 120 adds a Media Program Viewed entry 506 for the same user in the web activity database 130 with the value of title of the program subentry 512 being "Seinfeld."

In some implementations, the server system 120 has access to user web activity databases that are created and managed by other servers. In such cases, after receiving the user request 112, the server system 120 can retrieve relevant user web activity data 502 for the user by providing the user identifying information contained in the user request 112 to the servers of the databases.

After receiving the user request 112, the server system 120 next creates a search query 262 in accordance with the received user request 112 (608). In some implementations, the created search query includes only terms extracted from the user request 112, after stripping off the non-program-identifying information such as information identifying user calendars. This is typically done through natural language processing. While conducting natural language processing on a corpus of a text to generated a query, the server (120, FIG. 1) ignores uninteresting words which appear frequently across all writings, such as "a" or "the." Instead, the query server system (120, FIG. 1) focuses on more important words like words identifying people, places, and products, also known as interesting entities. By restricting the search space to interesting entities, both the time needed to generate the individual query and the time needed for data look up if the queries are stored in a database can be reduced. For example, if the user request 112 is "Please recommend three TV sitcom programs for the next 2 weeks for my Google Calendar," then the search query contains terms "TV" and "sitcom." As another example, if the user request 112 is "five action movies by Bruce Willis for this month and remind me in my Outlook calendar," the search query would contain terms "action," "movie" and "Bruce Willis."

In some implementations, the server system 120 creates the search query in view of the user web activity data 256 as well as the user request 112 (610) when the server system 120 has access to user web activity data. Typically, the server system 120 first identifies one or more terms relating to the user request 112 based on the user web activity data for the respective user (612). The server system 120 then builds a search query 262 that includes at least one of the terms identified by the server system 120 from the respective user's web activity data that are related to the received user request 112 and at least one term from the user request (614). Using the same user request for TV sitcom recommendation example above, if one of the search phrase 504 for that user contains both "TV sitcom" and "Seinfeld," although "Seinfeld" is not present in the current user request 112, the server system 120 would add "Seinfeld" as a term to the search query 262 being constructed.

In some implementations, while creating the search query, the server system 120 receives from the user information identifying the recommendation preferences of the user including number of media program events to recommend and time window over which the recommended media program events are scheduled (616). In some other implementations, before starting creating the search query, the server system 120 receives the information identifying the recommendation preferences as a follow up of receiving the user request 112 (not shown).

Figure 6A:
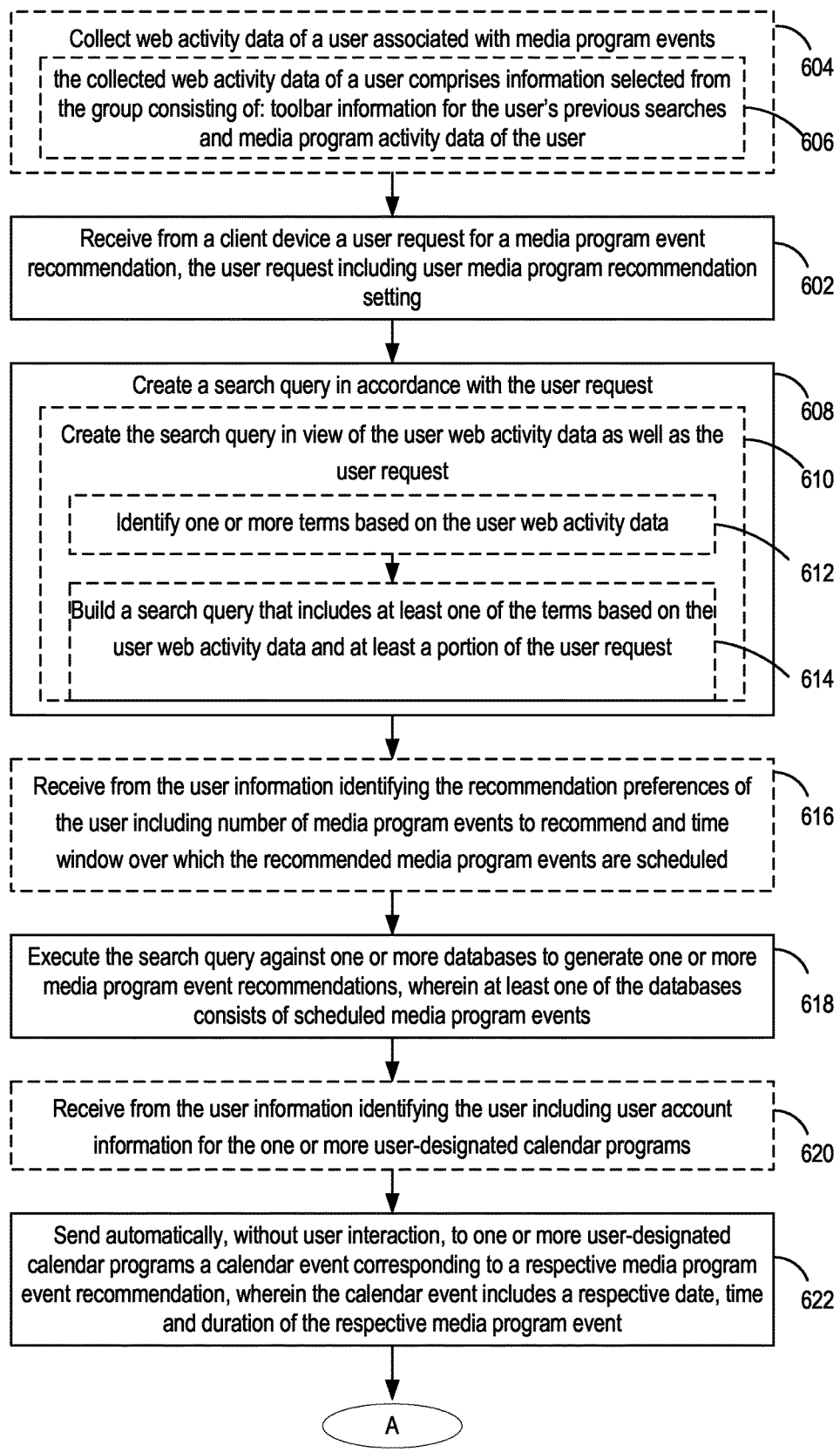
FIGS. 6A-6E include flow charts illustrating a method of searching and sending recommended media program event to a user's designated calendar in accordance with some implementations.
Figure 6B:
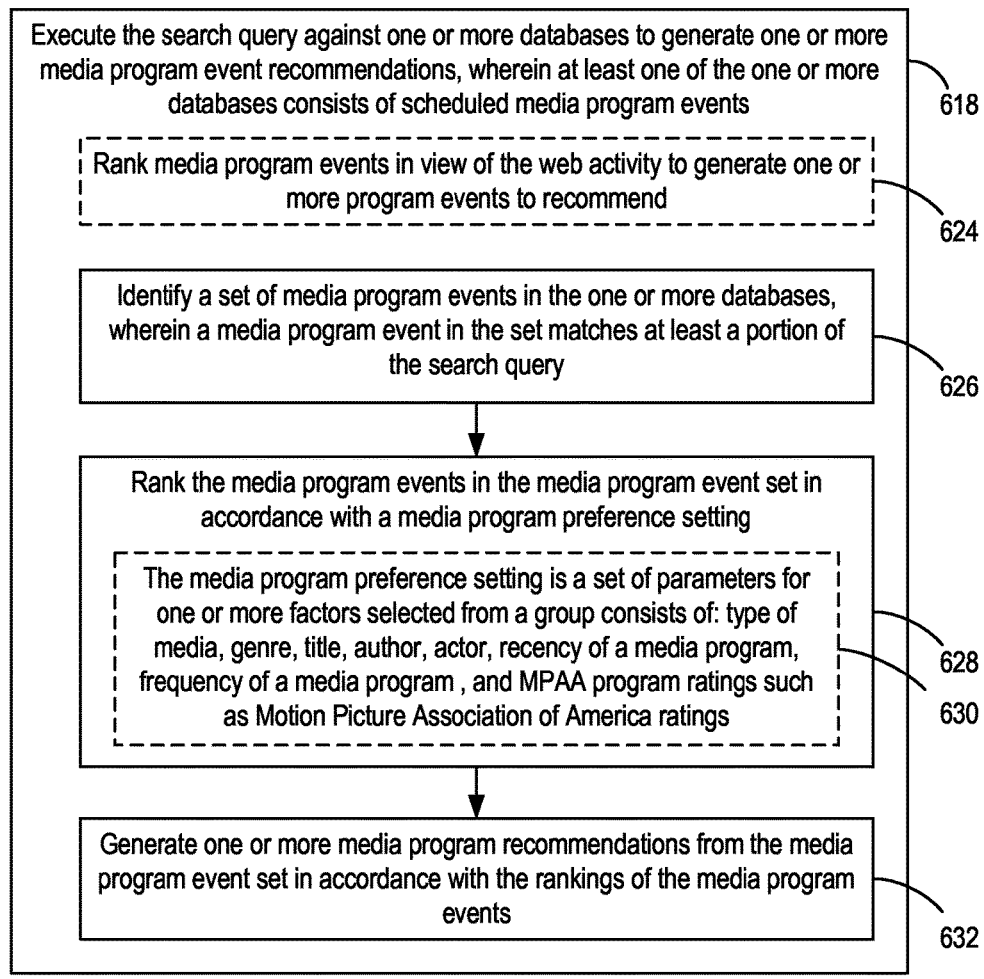

After a search query has been created, the server system 120 executes the search query 262 against one or more media program databases 130 to generate a program recommendation including one or more media program events, and at least one of the databases consists of scheduled media program events (618, FIGS. 6A and 6B). As used herein, "scheduled media program events" refer to media programs that have show times scheduled in the future.

In some implementations, the media program databases 130 are licensed from third party providers. Typically, the data in the licensed or purchased media program databases 130 contain program title, scheduled presentation time(s), and venue/platform it plays, e.g., on TV, or in movie theatres, or at subscription website. Usually, the purchased program listing does not, however, provide all the important information such as description of the program and actor's names that is necessary for making relevant recommendation to users. In such cases, the server system 120 supplements the missing information by crawling the Internet using the matching title and other program information contained in the purchased program listing.

In some implementations, the server system 120 ranks media program events to generate the one or more media program event recommendations in view of the web activity (624). There are many different ranking methods that a server system 120 can employ. As a simple example, the server system 120 ranks media program events based on the frequency of a user's YouTube viewing of different genres according to some implementations. If the server system receives a user request 112 for recommending movies available for the next two weeks and the user web activity data shows that a user watches on the YouTube movie trailers of comedy most often, with action movies immediately follow, which in turn is followed by other genres, the server system 120 would first identify all the movies available in the local theaters for the next two weeks and then rank these movies in the order of comedy, action and the rest of the genres.

In some implementations, the server system 120 first identifies a set of media program events in the one or more databases of scheduled media program events by selecting media program events that match at least a portion of the search query 262 (626). For example, if the term "comedy"

in the user request 112 is found in an entry of program 410-1 in the media program event database 130 and program 410-1 has a show time 416 in the future, program 410-1 is added to the identified set.

The server system 120 then ranks the set of identified media program events according to a media program preference setting (628). The media program preference setting is a set of parameters for all or a subset of the following categories: type of media, genre, title, author, cast, recency of a media program, frequency of a media program, and MPAA program ratings such as Motion Picture Association of America ratings (630). Some examples of the type of media are TV programs, movies played in the theatre, Internet streaming or live concert. As used herein, the term "recency of a media program" refers to the relative timing information such as the last time when the user viewed or searched about that media program, and is a good indicator of the user's interest in viewing that program.

In some implementations, each parameter in the preference setting has a set of values for a particular user. For each program in the identified set, the server system 120 calculates the total score based on the value of each parameter in the preference setting. The server system 112 then ranks all the candidate programs identified in step 626 based on the scores, the higher the score the more relevant the program is in response to the user's request. For example, a preference setting has three parameters with the following predetermined values: the genre has five possible values (5 for comedy, 4 for action movies or TVs, 3 for musical performances, 2 for sports events, and 1 for the rest of program genres); the type of media has five possible values (4 for programs via Internet streaming, 3 for movies in the theatres, 2 for TV programs, 1 for performance halls, 0 for the rest); and the frequency parameter simply takes as the value the number of times the user searched for or watched a particular program. Accordingly, a comedy movie in the identified set that is available for purchase on the Internet and that the user has previously searched on Internet for 5 times would have a score of 14; whereas, an action movie in the identified set that is available on TV and the user has never searched on Internet before has a total score of 6. Thus, the comedy movie with a score of 14 ranks higher than the action TV with a score of 6.

In some implementations, some of the parameters in the media program preference setting are not user specific. These generic preference parameters are typically predetermined based on live side-by-side experiments. For example, to fine tune the value of a particular parameter, two groups of users are selected. Each group is presented to one of the two different sets of program recommendation. Each set of recommendation results is based on a different value of the parameter being tuned while holding the rest of the parameters the same. The parameter value corresponding to the more received recommendation set is kept. This fine tuning of a preference parameter value usually takes many rounds of experiments.

Having ranked the media program event set with each media program matching at least a portion of the search query, the server system then generates one or more media program recommendations from the identified media program event set in accordance with the rankings of the media program events (632). For example, if the user has requested to recommend five program events in the user request 112, the server system 120 generates a recommendation consisting of the top five media program events.

Returning to FIG. 6A, in some implementations, the server system 120 receives from the user as part of the user request 112 information identifying the user including user account information for the one or more user-designated calendar programs. In some other implementations, the server system 120 receives from the user information identifying the user including user account information for the one or more user-designated calendar programs after the server system 112 has completed executing the search query against the databases (620).

Figure 6C:
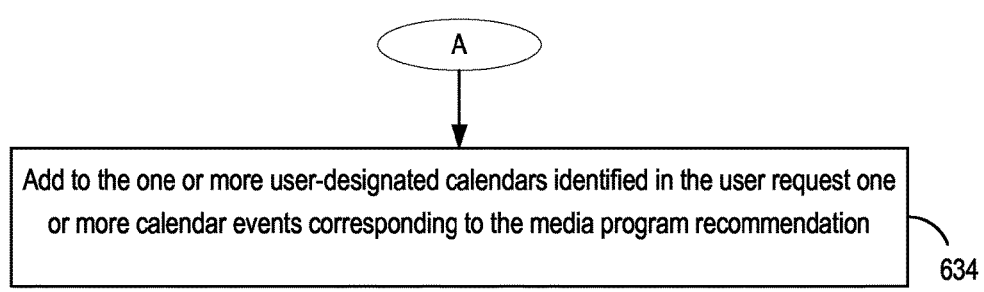

In some implementations, the server system 120 next sends automatically, without user interaction, to one or more user-designated calendar programs a calendar event corresponding to the media program event recommendation generated in step 618 above. Each calendar event includes a respective date, time and duration of the respective media program event (622). In some implementations, the server system 112 leaves it to the calendar server of the user designated calendars to determine how to present the recommended media program events on the designated calendars. In some implementations, the server system 120 directly adds to the one or more user-designated calendars identified in the user request one or more calendar events corresponding to the media program recommendation (634) (FIG. 6C).

Figure 6D:
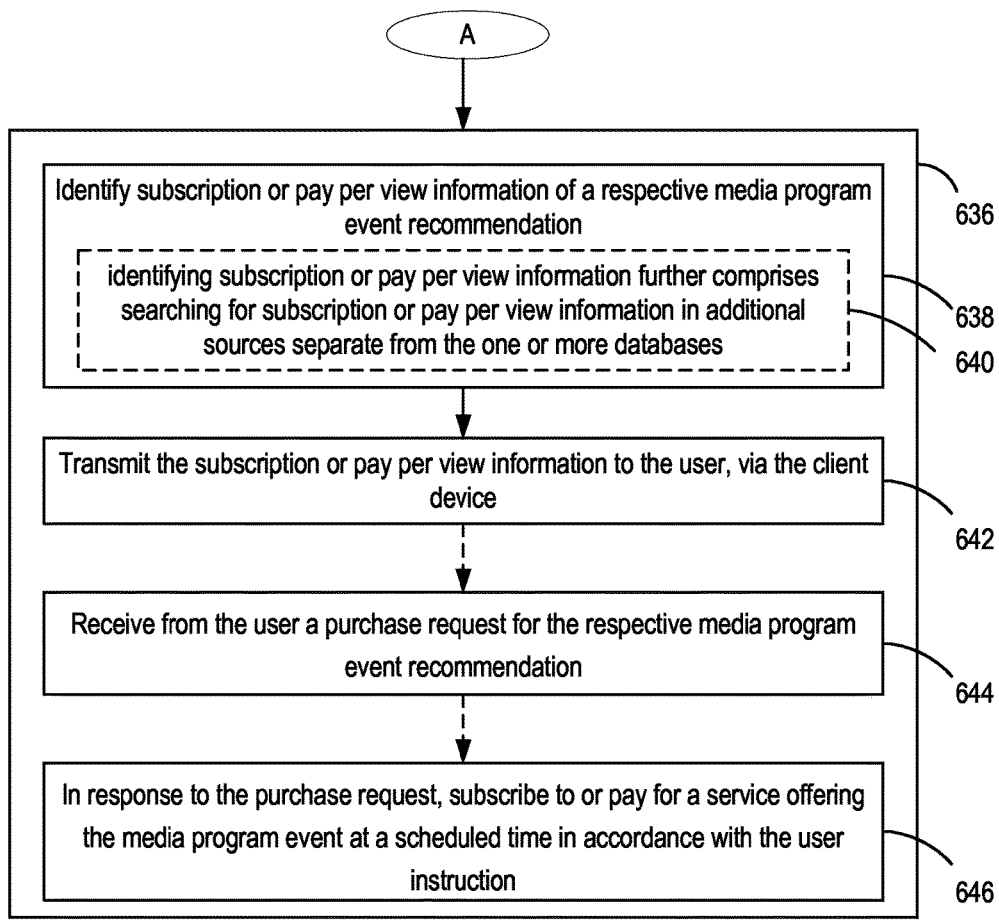

FIG. 6D depicts the flow of a server system 120 subscribing to or setting up pay per view on behalf of the user for each media program in the recommendation (636), according to some implementations. The server system 120 first identifies subscription or pay per view information of a respective media program event in the recommendation based on the information in the media program event database(s) (638). In some implementations, the server system searches for subscription or pay per view information in additional sources separate from the one or more databases to identify subscription or pay per view information (640), including for local (i.e., not just Internet) events. For example, the pay per view information for a recommended movie to be played in a local theater coming Sunday includes the ticket price and the payment methods available (e.g., online with a credit card number.) As another example, a recommended program can be viewed for certain time at a website that requires a membership. The subscription information then includes the subscription website URL and whether membership fee is required.

Having obtained the subscription or pay per view information, the server system 120 next transmits that information to the user, via the client device (642).

In some implementations, the server system 120 receives from the user a purchase request for the respective media program event recommendation (644). In response to the purchase request, the server system 120 subscribes to or pays for a service offering the media program event at a scheduled time in accordance with the user purchase request (646).

Figure 6E:
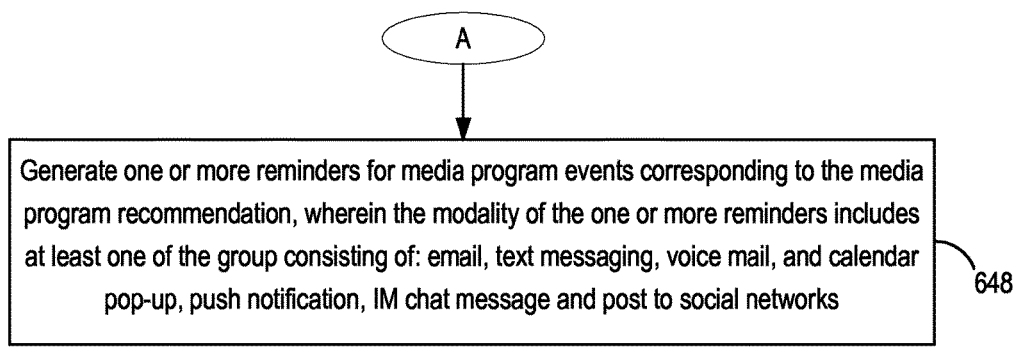

FIG. 6E illustrates that the server system 120 generates one or more reminders for media program events corresponding to the media program recommendation. In some implementations, the modality of the one or more reminders includes at least one form from the group consisting of: email, text messaging, voice mail, and calendar pop-up, push notification, IM chat message and post to social networks (648).

Figure 7:
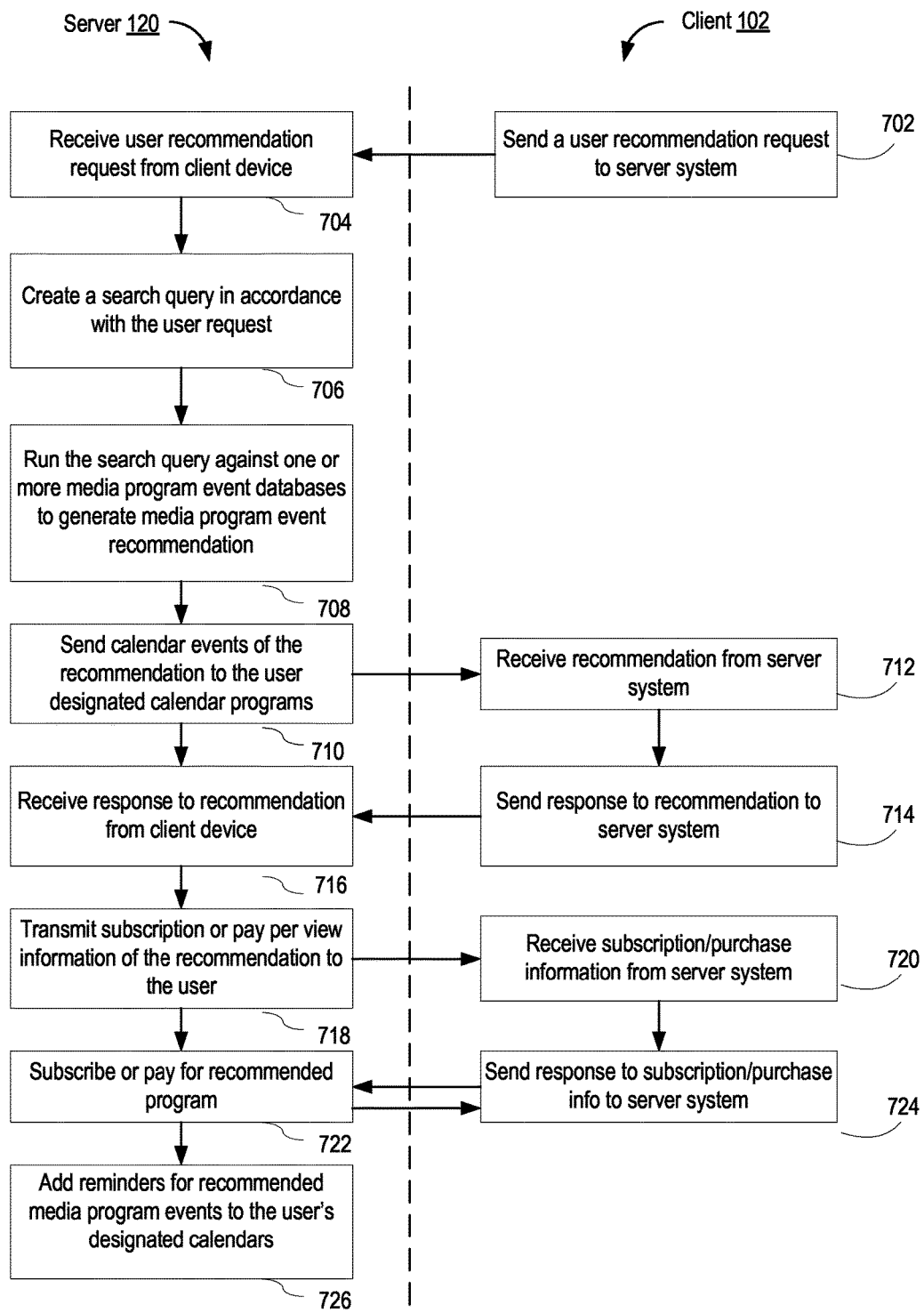
FIG. 7 is a flow diagram illustrating the communication between a client and a server system in accordance with some implementations.

FIG. 7 illustrates the communication between a client 102 and a server system 120 according to some implementations. Typically, a client 102 sends a user request 112 for media program event recommendation to a server system 120 (702). In some implementations, the user request 112 includes not only the type of media programs the user desires but also the recommendation preferences such as the number of programs, the duration of the programs and the user calendar accounts so the server system 120 can send recommended program events to. The server system 120 receives the user recommendation request from the client device (704) and then creates a search query that is associated with the user request (706). The server system 120 next runs the created search query against one or more media program event databases to generate a media program event recommendation (708).

The server system 120 then sends events of recommendation to the user designated calendar programs (710). In some implementations, a client 102 receives the recommendation in response to the user request 112 directly from the server system 120 (712). In some other implementations, a client 102 receives the notification of the recommendation through the server of the user designated calendars (not shown).

In some implementations, the client 102 sends user feedback to the server system 120 in response to the received recommendation (714). For example, the user does not like one of the recommended events and sends the server 120 a message conveying this. The server system 120 receives user response to the recommendation (716), and updates the user web activity database 130 and user preference setting 258 accordingly.

In some implementations, one or more of the recommended program events require further user action. For example, a recommended program event is a movie that is going to be played in the theater starting on coming Sunday. As another example, a recommended program event is a program that can be viewed for certain time at a website that requires a membership. Having determined that a payment or a subscription is required, the server system 120 transmits additional information (e.g., the ticket price, the web site where the ticket can be purchased using a credit card, or the subscription website URL) to the user via the client 102 (718). The client device 102 receives the payment or subscription related information from the server system 120 (720) and present it to the user (not shown). The user then sends instruction via the client 102 regarding whether to subscribe or purchase the recommended program (724). If the user instruction is affirmative, the server system 120 subscribes to or pays for the recommended program on behalf of the user (722).

In some implementations, the server system 120 also adds reminders for recommended media program events to the user's designated calendars in addition to adding the events to the calendars (726). For example, the server system 120 may communicate with the server of a user designated calendar to add an email reminder two days prior to the premier date of a recommended movie or the date of a movie for which the server system 120 has purchased a ticket for the user.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Methods and systems for searching and/or subscribing to media programs and notifying the user before a recommended program starts are described above. Reference have been made in detail to certain implementations, examples of which are illustrated in the accompanying drawings. While the invention has been described in conjunction with the implementations, it will be understood that the implementations are not intended to limit the invention to these particular implementations alone. It will be apparent to one of ordinary skill in the art that some implementations may be practiced without these specific details. In other instances, methods, procedures, components, and networks that are well-known to those of ordinary skill in the art are not described in detail to avoid obscuring aspects of the implementations described in this document.

What is claimed is:

1. A computer implemented method, comprising:
at a server system having one or more processors and memory storing programs for execution by the one or more processors:
receiving, from a client device, a user request from a user for a media program event recommendation, wherein the user request includes a user media program recommendation setting and a user designation of one or more calendar programs;
prior to receiving the user request, collecting web activity data, of the user, associated with media program events;
prior to receiving the user request, obtaining and storing one or more interest subscriptions of the user, wherein a respective interest subscription is associated with a genre or one or more keywords;
creating a search query in accordance with the user request, the interest subscriptions of the user, and the web activity data of the user, including:
identifying one or more terms based on the web activity data of the user;
building the search query that includes at least one of the terms based on the web activity data of the user and at least a portion of the user request;

executing the search query against one or more databases to generate one or more media program event recommendations, wherein at least one of the databases comprises scheduled media program events, including ranking media program events in the one or more databases in view of the web activity data of the user; and sending automatically, without user interaction, to a calendar server of the one or more user-designated calendar programs a calendar event for a calendar associated with the user, the calendar event corresponding to a respective media program event recommendation, wherein the calendar event includes a respective date, time and duration.

2. The method of claim 1, wherein the collected web activity data of the user comprises information selected from the group consisting of: toolbar information for the user's previous searches and media program activity data of the user.

3. The method of claim 1, wherein executing the search query against the one or more databases further comprises:
identifying a set of media program events in the one or more databases, wherein a media program event in the set matches at least a portion of the search query;
ranking the media program events in the media program event set in accordance with a media program preference setting; and
generating one or more media program recommendations from the media program event set in accordance with the rankings of the media program events.

4. The method of claim 3, wherein the media program preference setting is a set of parameters for one or more factors selected from a group consisting of: type of media, genre, title, author, actor, recency of a media program, frequency of a media program, and program ratings.

5. The method of claim 1, further comprising:
identifying subscription or pay per view information of a respective media program event recommendation; and
transmitting the subscription or pay per view information to the user, via the client device.

6. The method of claim 5, wherein identifying subscription or pay per view information further comprises searching for subscription or pay per view information in additional sources separate from the one or more databases.

7. The method of claim 5, further comprising:
receiving from the user a purchase request for the respective media program event recommendation; and
in response to the purchase request, subscribing to or paying for a service offering the media program event at a scheduled time in accordance with user instruction.

8. The method of claim 1, further comprising adding to the one or more user-designated calendars one or more calendar events corresponding to the media program recommendation.

9. The method of claim 1, further comprising generating one or more reminders for media program events corresponding to the media program recommendation, wherein the modality of the one or more reminders includes at least one of the group consisting of: email, text messaging, voice mail, calendar pop-up, push notification, IM chat message and post to social networks.

10. The method of claim 1, further comprising receiving from the user information identifying the recommendation preferences of the user including number of media program events to recommend and time window over which the recommended media program events are scheduled.

11. The method of claim 1, further comprising receiving from the user information identifying the user including user account information for the one or more user-designated calendar programs.

12. A server system, comprising:
one or more processors; and
memory storing one or more programs for execution by the one or more processors, the one or more programs comprising instructions for:
receiving, from a client device, a user request from a user for a media program event recommendation, wherein the user request comprises user media program recommendation setting and a user designation of one or more calendar programs;
prior to receiving the user request, collecting web activity data, of the user, associated with media program events;
prior to receiving the user request, obtaining and storing one or more interest subscriptions of the user, wherein a respective interest subscription is associated with a genre or one or more keywords;
creating a search query in accordance with the user request, the interest subscriptions of the user, and the web activity data of the user, including:
identifying one or more terms based on the web activity data of the user;
building the search query that includes at least one of the terms based on the web activity data of the user and at least a portion of the user request;
executing the search query against one or more databases to generate one or more media program event recommendations, wherein at least one of the one or more databases comprises scheduled media program events, including ranking the one or more media program event recommendations in view of the web activity data of the user; and
sending automatically, without user interaction, to a calendar server of the one or more user-designated calendar programs a calendar event for a calendar associated with the user, the calendar event corresponding to a respective media program event recommendation, wherein the calendar event includes a respective date, time and duration.

13. The system of claim 12, wherein the collected web activity data of the user comprises information selected from the group consisting of: toolbar information for the user's previous searches and media program activity data of the user.

14. The system of claim 12, further comprising instructions for:
identifying subscription or pay per view information of a respective media program event recommendation; and
transmitting the subscription or pay per view information to the user, via the client device.

15. The system of claim 12, further comprising instructions for adding to the one or more user-designated calendars one or more calendar events corresponding to the media program recommendation.

16. The system of claim 12, further comprising instructions for generating one or more reminders for media program events corresponding to the media program recommendation, wherein the modality of the one or more reminders includes at least one of the group consisting of: email, text messaging, voice mail, calendar pop-up, push notification, IM chat message and post to social networks.

17. The system of claim 12, further comprising instructions for receiving from the user information identifying the recommendation preferences of the user including number of media program events to recommend and time window over which the recommended media program events are scheduled.

18. The system of claim 12, further comprising instructions for receiving from the user information identifying the user including user account information for the one or more user-designated calendar programs.

19. A non-transitory computer readable storage medium storing one or more programs for execution by one or more processors of a server, the one or more programs comprising instructions for:
receiving, from a client device, a user request from a user for a media program event recommendation, wherein the user request comprises user media program recommendation setting and a user designation of one or more calendar programs;
prior to receiving the user request, collecting web activity data, of the user, associated with media program events;
prior to receiving the user request, obtaining and storing one or more interest subscriptions of the user, wherein a respective interest subscription is associated with a genre or one or more keywords;
creating a search query in accordance with the user request, the interest subscriptions of the user, and the web activity data of the user, including:
identifying one or more terms based on the web activity data of the user;
building the search query that includes at least one of the terms based on the web activity data of the user and at least a portion of the user request;
executing the search query against one or more databases to generate one or more media program event recommendations, wherein at least one of the one or more databases comprises scheduled media program events, including ranking the one or more media program event recommendations in view of the web activity data of the user; and
sending automatically, without user interaction, to a calendar server of the one or more user-designated calendar programs a calendar event for a calendar associated with the user, the calendar event corresponding to a respective media program event recommendation, wherein the calendar event includes a respective date, time and duration.

20. The computer readable storage medium of claim 19, wherein the collected web activity data of the user comprises information selected from the group consisting of: toolbar information for the user's previous searches and media program activity data of the user.

21. The computer readable storage medium of claim 19, further comprising instructions for:
identifying subscription or pay per view information of a respective media program event recommendation; and
transmitting the subscription or pay per view information to the user, via the client device.

22. The computer readable storage medium of claim 19, further comprising instructions for adding to the one or more user-designated calendars one or more calendar events corresponding to the media program recommendation.

23. The computer readable storage medium of claim 19, further comprising instructions for generating one or more reminders for media program events corresponding to the media program recommendation, wherein the modality of the one or more reminders includes at least one of the group consisting of: email, text messaging, voice mail, calendar pop-up, push notification, IM chat message and post to social networks.

24. The computer readable storage medium of claim 19, further comprising instructions for receiving from the user information identifying the recommendation preferences of the user including number of media program events to recommend and time window over which the recommended media program events are scheduled.

25. The computer readable storage medium of claim 19, further comprising instructions for receiving from the user information identifying the user including user account information for the one or more user-designated calendar programs.

* * * * *